United States Patent Office 3,495,859
Patented Feb. 17, 1970

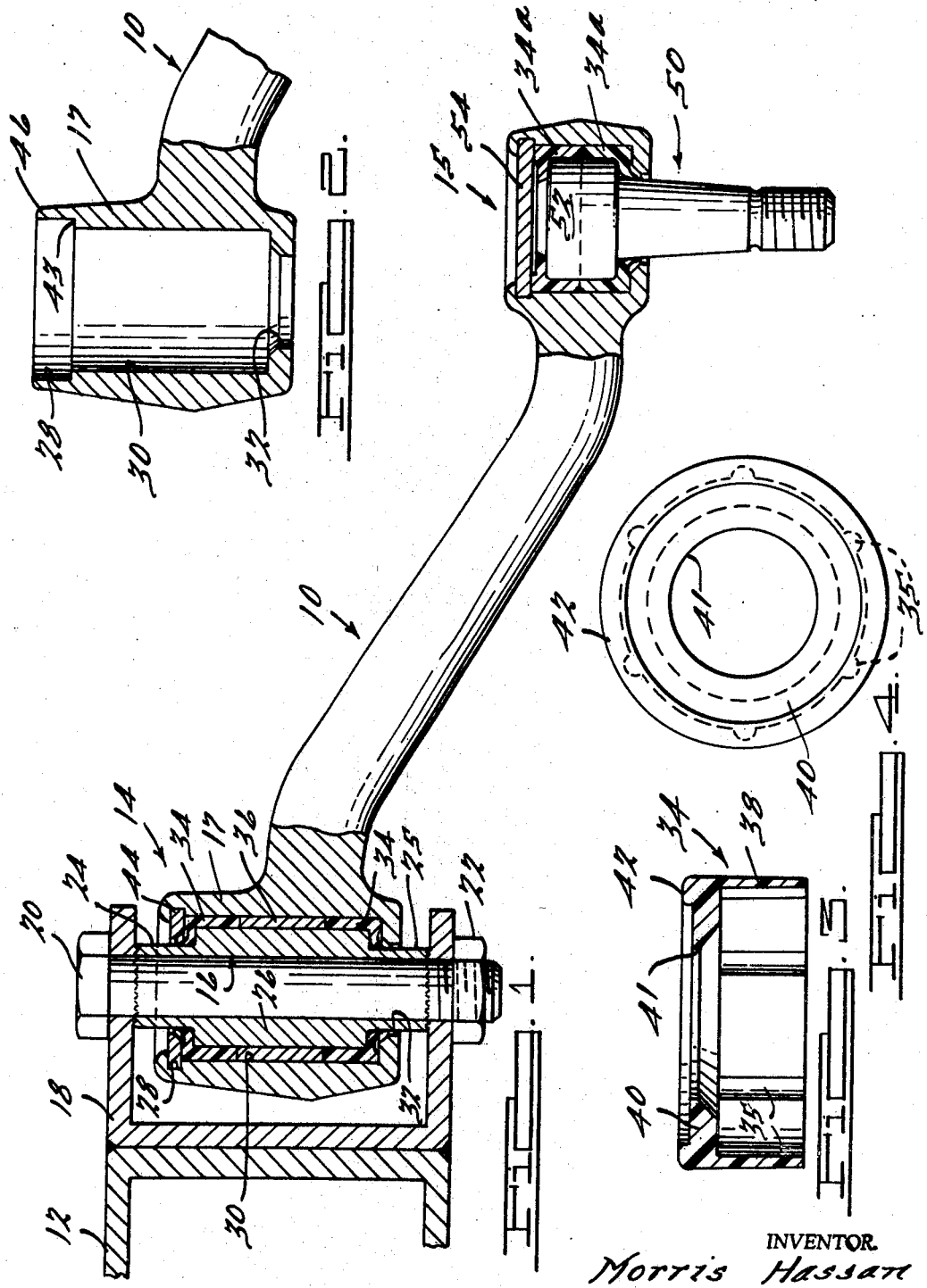

3,495,859
PIN JOINT ASSEMBLY
Morris Hassan, Trenton, Mich., assignor to Chrysler Corporation, Highland Park, Mich., a corporation of Delaware
Filed Dec. 8, 1964, Ser. No. 416,731
Int. Cl. F16c 11/04, 33/20
U.S. Cl. 287—100                                        7 Claims

ABSTRACT OF THE DISCLOSURE

A pin joint wherein a cylindrical bushing of elastic plastics material is fitted concentrically between the spaced cylindrical surfaces of the two parts to be connected. The bushing has a wall thickness when relaxed less than the width of the space between the cylindrical surfaces so that it may be readily slid into place between the surfaces, whereafter it is compressed axially to tightly press it against the cylindrical surfaces and provide a tight bearing.

---

This invention relates to pin joint assemblies. More particularly, it relates to a pin joint assembly for the idler arm of an automotive steering linkage.

It is an object of the present invention to provide an improved pin joint assembly.

A further object is to provide a pin joint assembly that will be more durable than known assemblies.

Another object is to provide a pin joint assembly that may be relatively inexpensively produced.

A more specific object is to provide a pin joint assembly as aforesaid having means for automatically taking up in compensation for wear at the bearing interface.

These and other objects, features and advantages of the invention will be apparent from the following detailed description of preferred embodiments of the invention and from the accompanying drawing in which:

FIGURE 1 is a view, partially in section, of an idler arm assembly embodying pin joint assemblies according to the invention;

FIGURE 2 is a fragmentary cross sectional view showing details of the configuration of the anchor end of the idler arm of FIGURE 1;

FIGURE 3 is a cross sectional view, on an enlarged scale, of a bushing for use in the pin joint asesmblies of FIGURE 1; and FIGURE 4 is a top view of the bushing of FIGURE 3.

FIGURE 1 shows an idler arm, seen generally at 10, for an automobile steering linkage. Arm 10 is pivotally connected at one end to a frame member 12 of the automobile and at its other end to the center link (not shown) of the steering linkage.

This invention concerns the joint assemblies whereby the idler arm is connected to frame 12 and the center link. Of course, and as will be hereinafter apparent, the invention is not limited to idler arm joint assemblies but has application wherever a pin joint is required.

The joint assembly, seen generally at 14, pivotally connecting idler arm 10 to frame member 12 comprises one embodiment of the invention and the joint assembly, seen generally at 15, pivotally connecting idler arm 10 to the steering linkage center link comprises another embodiment of the invention.

Joint assembly 14 will be described first. As best seen in FIGURE 1, assembly 14 comprises, broadly, a hollow pivot stud 16, a head 17 constituted by an enlarged end of idler arm 10 and defining a socket receiving stud 16, and bearing means interposed concentrically between stud 16 and the head socket to facilitate relative rotation therebetween.

Pivot stud 16 is clamped firmly between the upper end lower arms of a U clamp 18 by a bolt 20 passing centrally through stud 16 and through aligned apertures in the clamp arms for engagement by a nut 22. Clamp 18 is rigidly secured, as by welding, to frame member 12. Stud 16 includes upper and lower end portions 24 and 25 and a radially enlarged central portion 26.

Head 17, as best seen in FIGURE 2, includes an upper cylindrical bore 28, a main cylindrical bore 30 of a diameter slightly less than that of bore 28 and somewhat greater than that of center portion 26 of stud 16, and a lower cylindrical bore 32 of a diameter considerably less than that of bore 30 and slightly greater than that of lower end portion 25 of stud 16.

Referring again to FIGURE 1, the bearing means interposed between head 17 and stud 16 includes a pair of cylindrical sleeve bushings 34 and a cylindrical space sleeve 36. Bushing 34 are formed of a resilient plastics material, preferably a polyurethane plastic, and spacer sleeve 36 is formed of a rigid plastics material, such, e.g., as Delrin.

As best seen in FIGURES 3 and 4, each bushing 34 includes a tubular main body portion 38, a partition or base portion 40 having a central aperture 41 of a diameter slightly less than that of end portions 24, 25 of stud 16, and an annular bead portion 42. A plurality of circumferentially spaced axial lubricant grooves 35 are provided at the inner periphery of main body portion 38.

In the assembly of the joint, as best seen in FIGURE 1, one of the sleeve bushings 34 is slid into bore 30 to seat its bead portion 42 against the annular shoulder provided by the radial step between bores 30 and 32, and spacer sleeve 36 is slid in to seat on top of bushing 34. Stud 16 is then slid into spacer 36 and bushing 34 to press stud lower end portion 25 through partition aperture 41 and seat the shoulder provided by the radial step between stud portions 25 and 26 against the upper face of partition portion 40 of bushing 34. The inner periphery of portion 40 is chamfered (FIGURE 3) so that it lips or feathers over as stud lower end portion 25 is forced therethrough to provide a lower seal for retention of lubricant. The upper edge of bore 32 is chamfered to accommodate the feathered lip of partition 40. The other bushing 34 is then slide over stud 16 to seat its tubular body portion 38 on top of spacer sleeve 36 and feather the inner periphery of its partition 40 over stud upper end portion 24 to provide an upper lubricant seal.

The relaxed wall thickness of bushing 34 is such that the inner cylindrical surface of each bushing has a free sliding fit with stud central portion 26 and the outer cylindrical surface of each bearing has a free sliding fit with bore 30. The combined axial length of spacer sleeve 36 and the relaxed bushings 34 is slightly greater than the axial length of bore 30 so that, with the parts assembled as above, the annular bead portion 42 of the upper bushing 34 projects somewhat above the annular shoulder 43 (FIGURE 2) provided by the radial step between bores 28 and 30. A steel washer 44 is then placed on top of the projecting bead portion 42 and the upper lip 46 of head 17 is spun over to force washer 44 downwardly into seating engagement with shoulder 43 against the elastic resistance of bushings 34. Note that the lower inner edge of washer 44 is chamfered to accommodate the feathered lip of the partition 40 of the upper bushing 34.

This spinning operation compresses bushings 34 axially, whereby to flatten the bead portions 42 of each bushing, and radially expands the bushings so that they elastically press at their inner cylindrical surfaces against the central stud portion 26 and at their outer cylindrical surfaces against bore 30.

The cylindrical surface of bore 30 is not finished so that it is relatively rough as compared to the smooth outer cylindrical surface of stud central portion 26. Thus, as bushings 34 expand radially under the axial compression of washer 43, the elastic bushing material at the outer bushing periphery flows into and interlocks with the porous surface of bore 30 to prevent relative rotation between head 17 and bushings 34 while the elastic bushing material of the inner bushing periphery is pressed firmly against stud central portion 26 to provide a tight bearing interface for rotation of head 17 on stud 16.

As the bushings 34 wear at their inner pheriphery with sustained usage, the bead portions 42, which had been elastically flattened and widened in assembly of the joint, gradually shrink themselves toward their original width to force more bushing material into the annular space between bore 30 and central stud portion 26 in compensation for the bushing material worn away. Thus, the annular bearing space is maintained fully packed with bushing material despite considerable wear of the bushings. The joint assembly of the invention will thus function to maintain a tight bearing interface over sustained periods of operation.

The joint assembly 15 pivotally connecting idler arm 10 to the steering linkage center link is basically similar to joint assembly 14 and like reference numerals are used in the two assemblies to indicate like parts.

Assembly 15 differs from assembly 14 however in that the Delrin spacer sleeve is omitted to place the upper and lower bushings 34a in end to end contact and in that the pivot stud, seen generally at 50, is of the tapered shank type with an enlarged head 52 rotatably received within the stacked bushings 34a. Since stud 50 does not extend beyond the upper end of bushing 34a, washer 44 of assembly 14 is replaced by a disc 54 which, in addition to axially compressing the bushings, provides an upper lubricant seal for the assembly. To simplify parts inventory, upper bushing 34a retains the central partition aperture although, as will be apparent, such aperture has no function in joint assembly 15.

Although preferred embodiments of the invention have been illustrated and described, it is to be understood that various changes may be made in the disclosed embodiments without departing from the scope or spirit of the invention as defined by the appended claims.

I claim:
1. A pin joint assembly comprising:
   (A) a first member having a cylindrical bore;
   (B) a stud having
      (1) a relatively large diameter portion received concentrically within said bore in spaced relation thereto and defining therewith a relatively narrow annular space between said bore and said large diameter portion having a relatively large axial length,
      (2) a relatively small diameter shank portion at at least one end of said large diameter portion, each such shank portion extending axially from the respective end of said large diameter portion to a location beyond said bore, each such shank portion defining with said bore a relatively wide annular space therebetween having a relatively small axial length;
   (C) a cylindrical cup-shaped sleeve bushing of elastic plastics material having a relatively thin base portion and a cylindrical wall portion having an axial length at least twice the thickness of said base portion, a bushing as aforesaid being fitted over each end of said large diameter portion to seat the base portion of each bushing against the respective end of said large diameter portion and position the cylindrical wall portion of each bushing within said relatively narrow annular space between said large diameter portion and said bore,
      (1) each said bushing having a relaxed cylindrical wall thickness providing a free sliding fit at its outer cylindrical surface with said bore and at its inner cylindrical surface with said large diameter stud portion, and
      (2) each said bushing including an annular axially extending bead portion extending from said base portion at the side of the latter opposite the side from which said cylindrical wall portion extends and having an outer peripheral surface contiguous with that of said cylindrical wall; and
   (D) means axially compressing said bushings to compress and flatten said bead portions and radially expand said cylindrical walls to urge those walls into tight bearing engagement with said bore and said large diameter stud portion.

2. A pin joint assembly according to claim 1 wherein the bushing fitted over each end of said large diameter stud portion from which a shank portion as aforesaid extends has a central aperture in the base portion thereof and the material of said base portion around said aperture is chamfered to provide a lip which sealingly encircles the respective shank portion to provide a lubricant seal for said joint assembly.

3. A pin joint assembly according to claim 1 wherein said bushings are separated by a cylindrical spacer of rigid material encircling a central portion of said large diameter stud portion.

4. A pin joint assembly according to claim 1 wherein said bushings are stacked end to end within said relatively narrow annular space.

5. A pin joint assembly according to claim 1 wherein:
   (A) a shank portion as aforesaid extends from each end of said large diameter portion and the base portion of each bushing has a central aperture as aforesaid sealingly encircling the respective shank portion; and
   (B) said axially compressing means includes a washer encircling one of said shank portions and seating against the periphery of the base portion of the related bushing.

6. A pin joint assembly according to claim 1 wherein:
   (A) a shank portion as aforesaid extends from only one end of said large diameter portion; and
   (B) said axially compressing means includes a rigid disc seating against the periphery of the base portion of the bushing on the other end of said large diameter portion to provide a lubricant seal.

7. A sleeve bushing
   (A) formed of an elastic plastics material and including:
      (1) a cylindrical main body portion having a rounded end; and
      (2) a partition portion extending normal to the central axis of said main body portion adjacent but spaced axially from said rounded end to define
      (3) an annular bead portion extending from said partition portion to and including said rounded end,
said partition portion includes a central aperture and the material of said partition portion around said aperture is chamfered to provide a lip to sealingly pass a stud shank.

References Cited

UNITED STATES PATENTS 3,063,744  11/1962  Flumerfelt _____ 287—87

REINALDO P. MACHADO, Primary Examiner
A. V. KUNDRAT, Assistant Examiner

U.S. Cl. X.R.

280—95; 308—36.1, 238